United States Patent [19]
Fraser et al.

[11] Patent Number: 4,715,038
[45] Date of Patent: Dec. 22, 1987

[54] OPTICALLY PULSED ELECTRON ACCELERATOR

[75] Inventors: John S. Fraser; Richard L. Sheffield, both of Los Alamos, N. Mex.

[73] Assignee: The United States of America as represented by the United States Department of Energy, Washington, D.C.

[21] Appl. No.: 736,033

[22] Filed: May 20, 1985

[51] Int. Cl.$^4$ .............................................. H01S 3/00
[52] U.S. Cl. ........................................... 372/2; 372/9; 315/4
[58] Field of Search ................... 372/2, 9, 103; 315/4, 315/5, 4.5

[56] References Cited

U.S. PATENT DOCUMENTS 4,287,488 9/1981 Brau et al. .
4,313,072 4/1982 Wilson et al. ........................... 315/5

OTHER PUBLICATIONS

J. Timothy Riordan, "The Free-Electron Laser: Medicine's Rising Star," Photonics Spectra, 40, 42, 44 (Jul. 1983).
Richard B. Hall, "Lasers in Industrial Chemical Synthesis," Laser Focus, 57-62 (Sep. 1982).
C. Lee and P. E. Oettinger, "A Novel Electron Source for Generating High Density, High Quality Electron Beams," 3rd IEEE Int'l Pulsed Power Conf., Albuquerque, New Mexico, 1981, pp. 517-518.
Charles K. Sinclair and Roger H. Miller, "A High Current, Short Pulse, RF Synchronized Electron Gun for the Stanford Linear Accelerator," IEEE Transactions on Nuclear Science NS-28, 2649-2651 (Jun. 1981).
M. Yoshioka et al., "Lasertron: Laser Triggered RF--Source for Linacs in TeV Region," Proceedings of the 1984 Linear Accelerator Conf., Lufthansa-Schulungszentrum, Seeheim, (May 7-11, 1984), pp. 469-471.
Peter Oettinger, "Laser-Activated Electron Sources for FELs," Laser Focus, 10, 12, 14 (Jul. 1983).
Donald J. Liska, "Multipactoring Electron Gun for High Duty Linacs," IEEE Proceedings 59, No. 8, 1253-1254 (Aug. 1971).

*Primary Examiner*—Leon Scott, Jr.
*Attorney, Agent, or Firm*—Samuel M. Freund; Paul D. Gaetjens; Judson R. Hightower

[57] ABSTRACT

An optically pulsed electron accelerator can be used as an injector for a free electron laser and comprises a pulsed light source, such as a laser, for providing discrete incident light pulses. A photoemissive electron source emits electron bursts having the same duration as the incident light pulses when impinged upon by same. The photoemissive electron source is located on an inside wall of a radio frequency powered accelerator cell which accelerates the electron burst emitted by the photoemissive electron source.

14 Claims, 3 Drawing Figures

OPTICALLY PULSED ELECTRON ACCELERATOR

BACKGROUND OF THE INVENTION

The invention described herein relates generally to optically pulsed electron accelerators and more particularly to optically pulsed electron accelerators for use as improved injectors for free electron lasers. This invention is the result of a contract with the Department of Energy (Contract No. W-7405-ENG-36).

The free electron laser was first described by John Madey of Stanford in 1971. It is widely acknowledged that the free electron laser is of great potential value in the fields of medicine, spectroscopy, ir imaging, chemical processing, welding, laser fusion, communications and directed energy weapons. J. T. Riordan, "The Free-Electron Laser: Medicine's Rising Star," Photonics Spectra 40 (July 1983). R. B. Hall, "Lasers In Industrial Chemical Synthesis," Laser Focus 57 (September 1982). Compared to conventional lasers, free electron lasers provide broad tunability, excellent spot size control, excellent pulse width control and high power density and control.

A free electron laser includes an injector for providing a source of high energy electrons to be accelerated to higher energy levels to serve as the source of energy transferred to an optical output beam in the free electron laser. To operate efficiently, a free electron laser requires an injector that can simultaneously provide high peak current, short electron burst duration and high beam quality. A high quality beam is a low emittance beam, i.e., a beam with little motion in directions other than the desired direction of beam travel. Conventional injectors can not simultaneously achieve these three characteristics. Consequently, it is highly desirable to develop an injector that can simultaneously achieve these three characteristics.

A conventional electron accelerator (injector) for use with a free electron laser is powered by a radio frequency (rf) energy source. It comprises an electron gun, a buncher section whose purpose is to increase the system efficiency, and the accelerator proper. The electron gun usually consists of a thermionic electron emitter which may deliver a continuous current or it may be pulsed to deliver short bursts of electrons at widely varying repetition rates. The buncher section usually consists of one or more accelerating cavities whose function is to modulate the velocity of the electron stream in a sinusoidal manner with the result that at a position downstream from the buncher cavities, the electron current is periodically bunched or peaked. The periodicity of the bunches is harmonically related to the period of the rf energy source for the linear accelerator. An rf powered linear accelerator consists of a series of resonant cavities in which large sinusoidal electric and magnetic fields are established by the flow of rf energy into the cavity. The electron bunches are injected with the proper phase to be accelerated periodically by the rf electric field. In a traveling wave accelerator the electrons ride the crest of the electric field through successive cavities. In a standing wave accelerator, the electron bunches are shielded from the periodic decelerating fields by metallic drift tubes. Prior experience with conventional electron accelerators has demonstrated that a degradation of beam quality occurs in the bunching system. The optically pulsed electron accelerator of the present invention avoids this degradation by eliminating the bunching system.

U.S. Pat. No. 4,313,072 to Wilson et al. discloses a light modulated electron beam driven radio-frequency emitter for power generation. Pulses of light impinge on a photoemissive device which generates ane electron beam having the characteristics of the light pulses. However, the device described in Wilson et al. is designed to extract the energy from the accelerated electron beam so generated as radio frequency emission. Moreover, the electron beam is generated outside of the cavity and accelerated using dc electric fields applied between the photoemitter and the energy extraction cavity.

SUMMARY OF THE INVENTION

One object of the present invention is to provide a high-quality injector for use with a free electron laser.

Another object of the invention is to provide an electron accelerator that simultaneously has high peak current, short burst duration and high beam quality.

Still another object of the invention is to provide a low emittance electron beam.

To achieve the foregoing and other objects, and in accordance with the purposes of the present invention, as embodied and broadly described herein, there is provided an optically pulsed electron accelerator which may serve as an improved injector for a free electron laser. The optically pulsed electron accelerator comprises a pulsed light source for providing discrete incident light pulses. A photoemissive electron source is associated with and responsive to the pulsed light source. When impinged upon by the discrete incident light pulses it emits electron bursts having substantially the same duration. A first radio frequency-powered accelerator cell accelerates electron bursts emitted by the photoemissive electron source which is disposed on an inside wall of the first accelerator cell. The first accelerator cell has portions defining a cavity traversed by the electron bursts and a first aperture. Accelerated electron bursts leave the first accelerator cell through the first aperture. A magnet can be disposed between the pulsed light source and the first accelerator cell. The incident light pulses pass undeflected through the magnet and enter the first accelerator cell through the first aperture. The magnet deflects the accelerated electron bursts exiting from the first aperture towards the free electron laser. The first accelerator cell can include portions defining a second aperture through which the incident light pulses enter the first accelerator cell and impinge on the photoemissive electron source. The photoemissive electron source can include a plurality of serially connected radiofrequency-powered accelerator cells. The pulsed light source can be laser.

One advantage of the present invention is that the optically pulsed electron accelerator produces a low emittance electron beam.

Another advantage of the invention is that the high beam quality of the photoemissive electron source is maintained because bunching of the beam is eliminated.

Yet another advantage of the invention is that it has a simpler structure and is less expensive than conventional electron accelerators.

Another advantage of the invention is that the electron bunches are accelerated very rapidly after their formation by the optical pulsing of the photoemissive electron source thereby minimizing the time available for space charge forces to degrade the beam quality.

Still another advantage of the invention is that the optically pulsed electron accelerator simultaneously has high peak current, short burst duration and high beam quality.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE INVENTION

Figure 1:
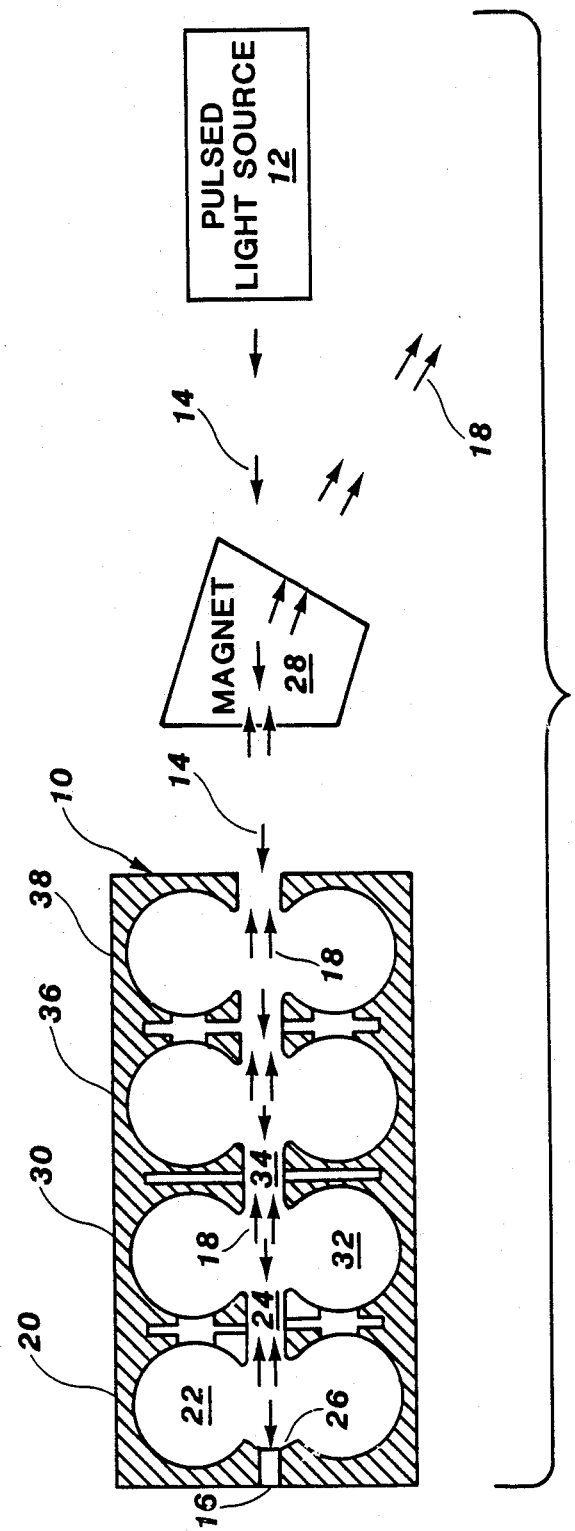
FIG. 1 shows a schematic view of a preferred embodiment of the invention.

Reference is now made to FIG. 1 which shows a schematic view of a preferred embodiment of the invention. The present invention is an optically pulsed electron accelerator 10 that can be used as an improved injector for a free electron laser (not shown). High intensity, high quality beams that are available from the optically pulsed electron accelerator 10 of the present invention are also of value in electron accelerators for research, radiation treatment of cancer and industrial radiography. The optically pulsed electron accelerator 10 comprises a pulsed light source 12 for providing discrete incident light pulses 14. Each of the incident light pulses 14 is represented by a single arrow 14. Photoemissive electron source 16 emits electron bursts 18 in response to incident light pulses 14. Each of the electron bursts 18 is represented by a pair of double arrows 18, as shown. The electron bursts 18 have substantially the same duration, to within picoseconds, as the incident light pulses 14. The duration of the incident light pulses 14 is controlled by pulsed light source 12. Pulsed light source 12 can be any intense light source which is gated or chopped by an electrooptical or acoustooptical switch (not shown). Pulsed light source 12 is preferably a laser and can be a Q-switched laser or a mode-locked laser.

A first radio frequency-powered accelerator cell 20 accelerates electron bursts 18. First radiofrequency-powered accelerator cell 20 has portions defining a cavity 22 traversed by electron bursts 18 and portions defining a first aperture 24 through which electron bursts 18 leave the first accelerator cell 20. Photoemissive electron source 16 can be disposed on an inside wall 26 of first accelerator cell 20. Photoemissive electron source 16 is in a high accelerating field and on the beam axis formed by incident light pulses 14. Incident light pulses 14 are timed to arrive with a predetermined phase of the sinusoidal rf field of first accelerator cell 20. Incident light pulses 14 should be of no greater duration than one-half of the rf cycle of first accelerator cell 20 and preferably should last less than one fourth of the rf cycle.

In typical rf accelerator applications, the desired electron bunch duration is required to be a small fraction of the rf period. In a conventional electron source, the required bunch duration is crudely achieved by a bunching system but only at the expense of severe beam quality degradation. With the optically pulsed electron accelerator 10 the desired bunch duration of electron bursts 18 is achieved automatically by selecting the appropriate duration for incident light pulses 14. Furthermore, the deleterious effects of the bunching process are eliminated.

A magnet 28 can be located between pulsed light source 12 and first accelerator cell 20. Magnet 28 deflects accelerated electron bursts 18 towards a free electron laser (not shown). Incident light pulses 14 pass undeflected through magnet 28 and enter first accelerator cell 20 through first aperture 24.

The embodiment of the optically pulsed electron accelerator 10 shown in FIG. 1 includes a second radio frequency-powered accelerator cell 30 for further accelerating electron bursts 18. Second radio frequency-powered accelerator cell 30 has portions defining a cavity 32 traversed by electron bursts 18 and portions defining an exit aperture 34 through which accelerated electron bursts 18 leave second accelerator cell 30. Depending on the desired energy level to which the electron bursts 18 are to be accelerated, any number of accelerator cells could be used. The accelerator cells can be standing wave or traveling wave. There is a third radio frequency-powered accelerator cell 36 and a fourth radio frequency-powered accelerator cell 38 in the embodiment shown.

Photoemissive electron source 16 can be selected from a class of high-efficiency semiconductor photoemitters. These materials are used in high-sensitivity photomultiplier devices and in night-vision devices. Preferably they have quantum efficiencies, i.e., efficiencies for converting visible light to electrons, above ten percent and ranging up to forty percent.

Photoemissive electron source 16 can be a negative electron affinity III–V compound electron emitter such as GaAs, GaP or GaAsP. Photoemissive electron source 16 can be a monoalkali compound such as $Cs_3Sb$, $K_3Sb$ or $Rb_3Sb$, or a multialkali compound such as NaKSb, KCsSb or CsNaKSb. A photoemissive electron source 16 that can be used in the infrared is AgOCs. Alkali halides such as CsI, NaI, CsBr, CsCl or KBr can be used in the near ultraviolet as can the Cs and Rb tellurides.

Figure 2:
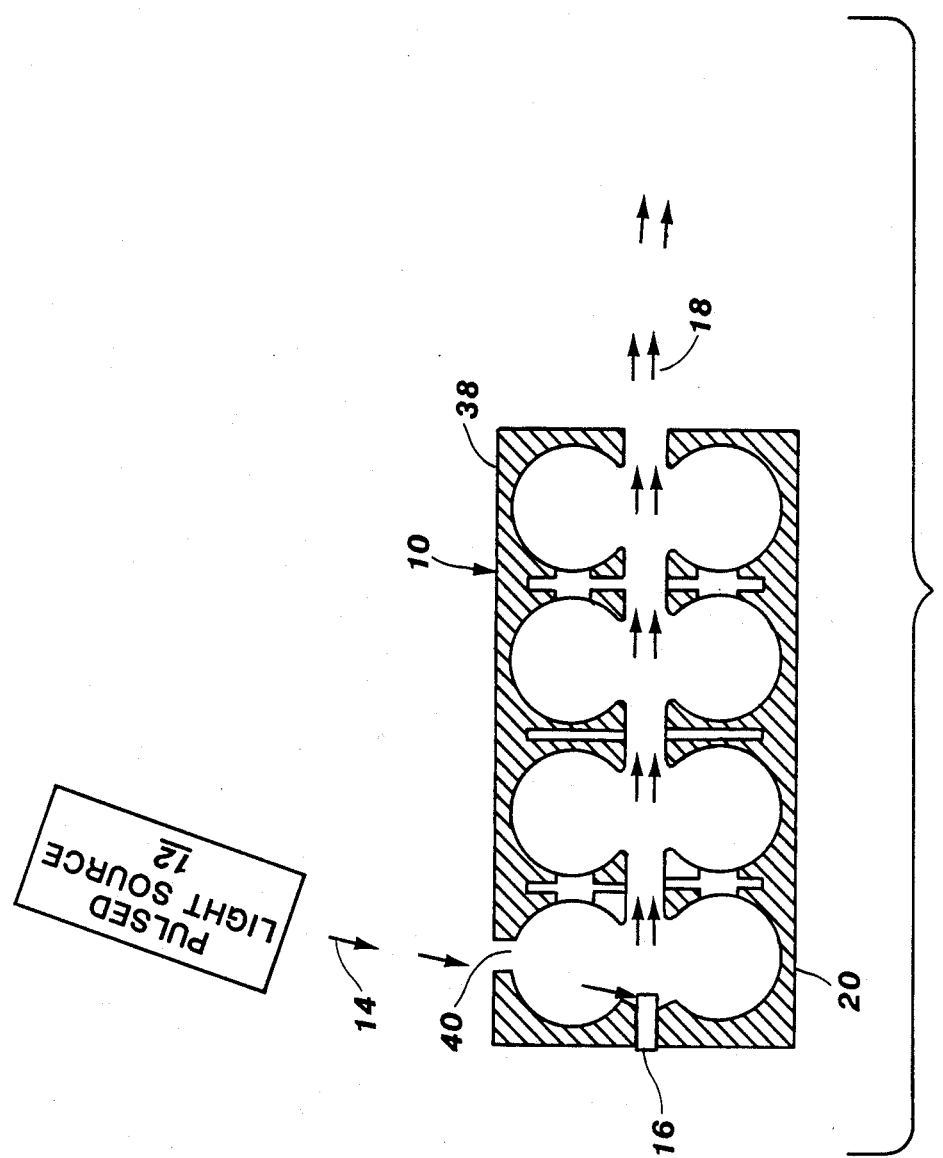
FIGS. 2 and 3 show schematic views of other embodiments of the invention.

Reference is now made to FIG. 2 which shows a schematic view of another embodiment of the invention. The differences between the FIG. 2 embodiment and that of FIG. 1 are that in FIG. 2 the optically pulsed electron accelerator 10 does not include a magnet 28 (as shown in FIG. 1) and first accelerator cell 20 includes portions defining a second aperture 40. Pulsed light source 12 is positioned so that incident light pulses 14 enter first accelerator cell 20 through second aperture 40 and impinge on photoemissive electron source 16. Electron bursts 18 leave fourth accelerator cell 38 and can be used without being deflected by the magnet 28 shown in FIG. 1.

Figure 3:
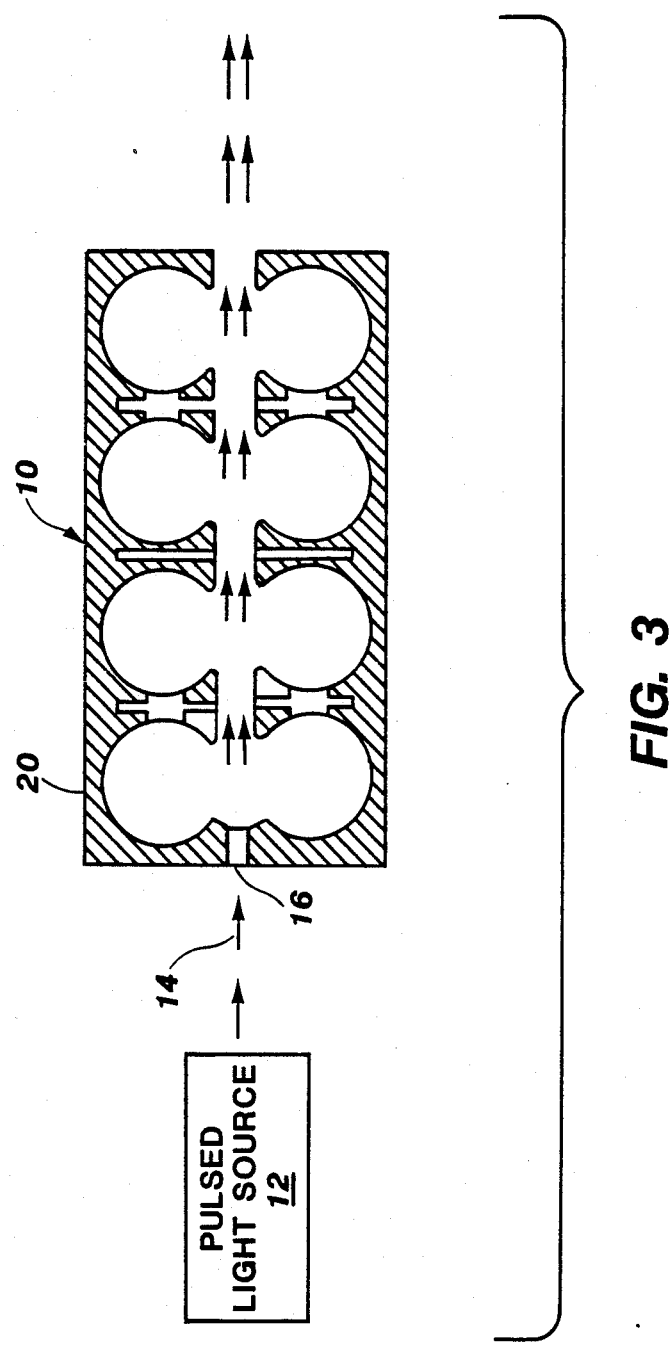

Reference is now made to FIG. 3 which shows a schematic view of another embodiment of the invention. The differences between the FIG. 3 embodiment and that of FIG. 1 are that in FIG. 3 the optically pulsed electron accelerator 10 does not include a magnet 28 (as shown in FIG. 1) and pulsed light source 12 is positioned so that incident light pulses 14 impinge on photoemissive electron source 16 without entering first accelerator cell 20.

The foregoing description of several embodiments of the invention has been presented for purposes of illustration and description. It is not intended to be exhaustive or to limit the invention to the precise forms disclosed. They were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optically pulsed electron accelerator comprising:
   a. a pulsed light source for providing discrete incident light pulses;
   b. a photoemissive source for receiving the light pulses emitted by said pulsed light source and for emitting electron bursts having substantially the same duration as the incident light pulses; and
   c. a first radio frequency-powered accelerator cell for accelerating electron bursts emitted by said photoemissive electron source, said first radio frequency-powered accelerator cell having portions defining a cavity traversed by the electron bursts and having an inside wall on which said photoemissive electron source is disposed, said first radio frequency-powered accelerator cell having portions defining a first aperture through which the electron bursts leave said first radio frequency-powered accelerator cell.

2. An injector for a free electron laser, said injector comprising an optically pulsed electron accelerator, said optically pulsed electron accelerator including:
   a. a pulsed light source for providing discrete incident light pulses:
   b. a photoemissive electron source for receiving the light pulses emitted by said pulsed light source and for emitting electron bursts having substantially the same duration as the incident light pulses; and
   c. a first radio frequency-powered accelerator cell for accelerating electron bursts emitted by said photoemissive electron source, said first radio frequency-powered accelerator cell having portions defining a cavity traversed by the electron bursts and having an inside wall on which said photoemissive electron source is disposed, said first radio frequency-powered accelerator cell having portions defining a first aperture through which the accelerated electron bursts leave said first radio frequency-powered accelerator cell.

3. The invention of claim 2 further comprising a magnet for deflecting said accelerated electron bursts towards the free electron laser, said magnet being disposed between said pulsed light source and said first radio frequency-powered accelerator cell, said incident light pulses passing undeflected through said magnet and entering said first radiofrequency-powered accelerator cell through said first aperture.

4. The invention of claim 2 wherein said first radio frequency-powered accelerator cell includes portions defining a second aperture, said pulsed light light source being positioned so that said incident light pulses enter said first radio frequency-powered accelerator cell through said second aperture and impinge on said photoemissive electron source.

5. The invention of claim 2 wherein said pulsed light source comprises a laser.

6. The invention of claim 5 wherein said laser comprises a mode-locked laser.

7. The invention of claim 5 wherein said laser comprises a Q-switched laser.

8. The invention of claim 2 further comprising a plurality of serially connected radio frequency-powered accelerator cells each having portions defining a cavity traversed by said electron bursts and each having portions defining an exit aperture through which said electron bursts leave each of said radio frequency-powered accelerator cells.

9. The invention of claim 2 wherein said photoemissive electron source comprises a negative electron affinity III-V compound electron emitter.

10. The invention of claim 2 wherein said photoemissive electron source comprises a monoalkali compound.

11. The invention of claim 2 wherein said photoemissive electron source comprises a multialkali compound.

12. The invention of claim 2 wherein said photoemissive electron source comprises an alkali halide.

13. The invention of claim 2 wherein said first radio frequency-powered accelerator cell comprises a standing wave accelerator.

14. The invention of claim 2 wherein said first radio frequency-powered accelerator cell comprises a traveling wave accelerator.

* * * * *